United States Patent [19]
Isenberg

[11] Patent Number: 5,715,032
[45] Date of Patent: Feb. 3, 1998

[54] PROGRESSIVE ADDITION POWER OPHTHALMIC LENS

[75] Inventor: John F. Isenberg, Pasadena, Calif.

[73] Assignee: Optical Radiation Corporation, Azusa, Calif.

[21] Appl. No.: 617,584

[22] Filed: Mar. 19, 1996

[51] Int. Cl.⁶ ............................................. G02C 7/06
[52] U.S. Cl. ............................................. 351/169
[58] Field of Search ............................. 351/168, 169, 351/170, 171, 172

[56] References Cited

U.S. PATENT DOCUMENTS

| | | | |
|---|---|---|---|
| 3,950,082 | 4/1976 | Volk | 351/169 |
| 4,307,945 | 12/1981 | Kitchen et al. | 351/169 |
| 4,514,061 | 4/1985 | Winthrop | 351/169 |
| 4,729,651 | 3/1988 | Kitani | 351/169 |
| 4,762,408 | 8/1988 | Shinohara | 351/169 |
| 4,838,674 | 6/1989 | Dufour | 351/169 |
| 4,861,153 | 8/1989 | Winthrop | 351/169 |
| 4,869,587 | 9/1989 | Breger | 351/169 |
| 4,934,808 | 6/1990 | Kitani | 351/169 |
| 4,988,182 | 1/1991 | Takahashi et al. | 351/169 |
| 5,000,559 | 3/1991 | Takahashi et al. | 351/169 |
| 5,048,945 | 9/1991 | Ueno et al. | 351/169 |
| 5,083,859 | 1/1992 | Jalie | 351/176 |
| 5,110,199 | 5/1992 | Ishida | 351/169 |
| 5,123,725 | 6/1992 | Winthrop | 351/169 |
| 5,237,181 | 8/1993 | Waido | 351/169 |
| 5,270,745 | 12/1993 | Pedrono | 351/169 |
| 5,272,495 | 12/1993 | Pedrono | 351/169 |
| 5,285,222 | 2/1994 | Waido | 351/169 |
| 5,335,026 | 8/1994 | Kato et al. | 351/159 |

OTHER PUBLICATIONS

Optical Research Associates report, "Mathematical Surface Formulation".

*Primary Examiner*—Scott J. Sugarman
*Attorney, Agent, or Firm*—Christie, Parker & Hale, LLP

[57] ABSTRACT

A progressive addition power lens having base and add spherical regions for providing refractive power correction for distance and near vision includes a central corridor characterized by a power curve expressed as a polynomial of at least the 11th degree. The surface contour of the intermediate corridor is defined by the surfaces of an ordered sequence of osculating spheres. The curvature of the surface of the intermediate region spreads away from the principal meridian in accordance with a spreading function having substantially circular level curves. Visual astigmatism is corrected over a substantial fraction of the base and add spheres by superposition of an aspheric function to the sag of the lens surface as defined by the polynomial and the spreading function.

14 Claims, 8 Drawing Sheets

PROGRESSIVE ADDITION POWER OPHTHALMIC LENS

FIELD OF THE INVENTION

The invention relates to the field of progressive addition power ophthalmic lenses and in particular to an improved progressive power lens with reduced visual astigmatism for the correction of presbyopia.

BACKGROUND OF THE INVENTION

Presbyopia is a medical condition which causes loss of accommodation of the human eye with advancing age. The condition is typically ameliorated by means of bifocal or trifocal spectacles fitted to correct for the near distance vision problems caused by presbyopia and any other visual defects. In recent years, the use of progressive addition power lenses has become increasingly popular for the correction or management of visual difficulties caused by presbyopia. Progressive addition lenses are particularly advantageous in that they permit generally clear and continuous vision at all distances. The breaks, or visual discontinuities, inherent in conventional bifocal or trifocal lenses are absent in a progressive addition lens which is constructed, typically, with a distance portion, a near vision portion, and a region of continuous transition between the two, corresponding more or less to the characteristics of bifocal or trifocal lenses. A progressive addition lens wearer may thus focus at every distance by merely changing the gaze position. In particular, the optical power on the upper (distance vision) portion of the lens is substantially constant. Similarly, the optical power of the lower portion (the near distance portion) is also substantially constant. Between the distance and near vision portions, the local power increases progressively along a central vision corridor to permit all-distance viewing.

However, progressive addition lenses also exhibit some well-known disadvantages which limit their universal acceptance. In particular, progressive addition lens designs tend to be practical for distance and near vision, but the lens periphery and the region adjoining the progression corridor exhibit strong surface astigmatism and detrimental effects on wear and comfort. These aberrations are inherent and much effort has been expended in attempts to reduce or minimize the effect. The inherent aberrations of a progressive addition lens are commonly compressed into the areas laterally adjacent the central progressive corridor and the near vision area. Because the area into which they are confined is small, these optical aberrations are characterized by relatively steep gradients of all optical characteristics: mean power, astigmatism and prism. Thus, the visual field afforded by a typical progressive addition lens is by no means a smooth and continuous one. Rather, it is characterized by alternately clear and blurred areas. Lenses exhibiting these discontinuous optical characteristics may not be tolerated by some wearers.

Accordingly, it is the object of the invention to provide a progressive addition spectacle lens with the smoothest possible distribution of dioptric power and the lowest possible level of unwanted astigmatism.

SUMMARY OF THE INVENTION

The present invention provides the desired features with a progressive addition power ophthalmic lens which comprises a lens body including base and add spherical regions for providing refractive power correction for distance and near vision, an intermediate corridor connecting the base and add spheres along an approximately vertical principal meridian of the lens surface, the corridor characterized by a continuously and smoothly varying refractive power in accordance with a power curve expressed as a polynomial which defines the local surface curvature along the principal meridian of the lens with respect to the y,z plane of a lens design coordinate system.

In one aspect of the invention, the power curve is defined as being continuous with respect to the base and add spherical functions at their regions of intersection, to at least the fifth derivative, and preferably the sixth derivative. In particular, the power curve is defined by a polynomial of at least the 11th degree.

In another aspect of the invention, the surface contour of the intermediate corridor is defined by the surfaces of an ordered sequence of spheres which osculate the power curve, each of whose radii of curvature corresponds to the radius of curvature of the power curve when the power curve is evaluated at the osculation point.

An intermediate optical region is disposed to either side and lies adjacent to the intermediate corridor. The intermediate region extends from the intermediate corridor to the periphery of the lens between the first and second optical portions. The curvature of the surface of the intermediate region spreads away from the principal meridian in accordance with a spreading function defined as the level curves of the conformal mapping of $$w = \tan z$$

whereby astigmatism is spread substantially uniformly into the entire area of the intermediate optical region. In particular, the level curves of the spreading function are circular, and the boundaries between the base and add spheres and the intermediate optical region are defined by respective chosen ones of the circular level curves of the spreading function.

The point of intersection between the level curves of the spreading function with the principal meridian identifies a corresponding osculating sphere associated with the principal meridian at the intersection point, the surface curvature of the osculating sphere defining the surface curvature of the lens along the isocontour of the spreading function.

In yet another aspect of the invention, visual astigmatism is corrected over a substantial fraction of the base and add spheres by superposition of a function in the form of an asphere to the sag of the lens surface as defined by the polynomial and the spreading function. Advantageously, the superposed asphere is a function of the form $$z_A = c_{51}h^4 + c_{52}h^6 + c_{53}h^8 + (c_{54}h^4 + c_{55}h^6 + c_{56}h^8)\sin\theta + (c_{57}h^4 + c_{58}h^6 + c_{59}h^8)\cos 2\theta + (c_{60}h^4 + c_{61}h^6 + c_{62}h^8)\sin 3\theta$$

where the sag $z_A = f(h^2) = f(x^2 + (y-y_o)^2)$, where $Y_o$ represents a coordinate compensation offset parameter and $\theta = \arctan([y-y_o]/x)$.

Coefficients of the asphere term are suitably determined by raytracing of the composite lens to map the visual astigmatism (as seen by the eye).

BRIEF DESCRIPTION OF THE DRAWINGS

These and other features, aspects and advantages of the present invention will be more fully understood when considered with regard to the following detailed description, appended claims and accompanying drawings wherein:

DESCRIPTION OF THE PREFERRED EMBODIMENT(S)

Progressive addition lenses contemplated by the present invention are typically constructed of a conventional glass or plastic material having a uniform refractive index. The front surface is convex and is characterized by a non-rotationally symmetrical aspheric, while the back surface is generally concave and prescription ground into a spherical, cylindrical, or toric shape. The surface curvatures required for progressive addition power are confined to the front (convex) surface of the lens while the back (concave) surface is reserved for conventional prescription grinding to correct for particular optical defects of the user.

As is common in optical design, the mathematical description of the surface formulation of a progressive addition lens uses a three dimensional Cartesian coordinate system. The x and y coordinate axes are orthogonal to one another and tangent to the lens surface at their origins (i.e. at 0,0), while the depth of the lens (referred to herein as the "sag" of the surface) is defined as a function z, the axis of which is perpendicular to the x,y plane. In accordance with optical design convention, the positive y direction is up, the positive x direction is to the wearer's right, and the sag (z) of the lens surface is an explicit function of x and y:

$$z=z(x,y)$$

The particular coordinate system described with respect to optical design parameters is commonly termed the "design" coordinate system. After a particular set of lenses has been manufactured and adapted to fit into spectacle frames, the lens coordinate system experienced by the wearer, where the eyeball center lies on the positive z axis, is offset and rotated slightly with respect to the design coordinate system.

Using the design coordinate system, the first characteristic which must be specified for an effective progressive addition lens is the shape of the curve of intersection of the front surface of the lens with the yz plane (i.e., at z(0,y)). As can be seen with reference to FIG. 1, the progressive lens surface 10 is disposed tangent to the y axis at its (0,0) intersection with the z axis. A vertical plane (y,z) thus passes substantially through the center of the progressive lens surface, dividing the lens into symmetrical halves. In accordance with optical design convention, the (y,z) plane is termed the principal vertical meridian, while its curve of intersection with the progressive lens surface 10 is commonly termed the central meridian profile, the central meridian or the meridional line. When the lens is mounted in an eyeglass frame, the central meridian is not exactly vertical, but is rotated slightly such that the near vision portion (region A in FIG. 2) is closer to the wearer's nose. This compensates for the binocular convergence needed for viewing nearby objects.

Figure 1:
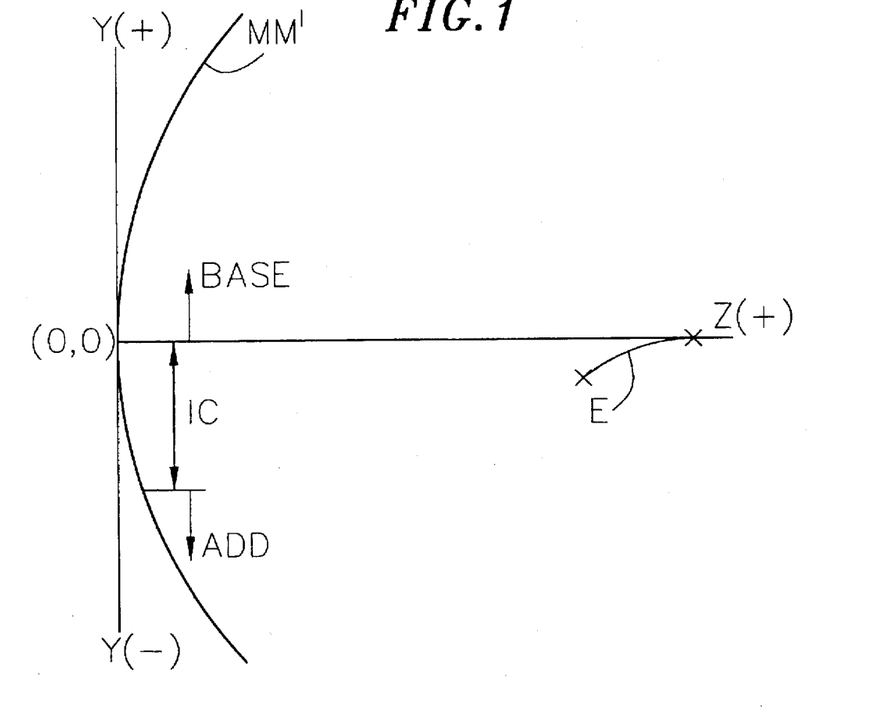
FIG. 1 is a graphical representation of a cross-section of the surface of a progressive addition lens in accord with the invention depicting the principal meridian, the evolute, and the y,z coordinate axes.

As depicted in FIG. 1, along the central meridian profile MM', the progressive addition lens comprises a region B having a refractive power adapted for distance vision, located along an upper portion of the central meridian in the region y>0. The distance vision region B, is defined by a uniform circular arc, defined in turn as the great circle arc of intersection between a spherical surface of radius $z_1$ and the y,z plane. The central meridian profile further comprises a region A having a refractive power adapted for reading, or near vision, located along the lower portion of the central meridian profile of the progressive lens surface. The near vision portion A is likewise defined by a great circle arc of intersection between a spherical surface of radius $z_2<z_1$ and the y,z plane. Conventionally, these spherical surface regions are termed, respectively, the base sphere and the add sphere and define the spherical surfaces of the distance (top) and near (bottom) vision portions of the progressive addition lens.

Between the two circular regions, the central meridian profile defines a continuous plane power curve IC, having a characteristic length L, the curvature of which increases continuously in a predetermined manner from the (minimum) base sphere curvature value at y=0, to the (maximum) add sphere curvature at y=−L. This region along the central meridian is conventionally termed the intermediate corridor and defines the progressive power addition of the lens between the base and the add powers (also termed the intermediate power region). The characteristic curvature of all points along the central meridian profile may be readily expressed mathematically in terms of the sag z(x,y) of the lens surface away from the x,y plane, or, in the case of the central meridian, from the y axis. For the base and add sphere regions, the sag function is described in terms of circular arcs, having radii $z_1$ and $z_2<z_1$ respectively, with the y offset of the add sphere's center of curvature being the only free parameter.

However, the sag function z(0,y) along the central meridian profile must exhibit certain special properties. The sag function must define a smooth and continuously varying curve and, at its ends (y=0 and Y=−L), it must smoothly connect to the circular arcs defined by the add and base spheres. In order to match the curvature (match the power) of the spheres, the sag function z(0,y) must be mathematically continuous with the base and add sphere functions at the end points y=0 and y=−L to at least the second derivative. In order to allow a gradual (parabolic) onset of power at the end points, continuity to the fourth derivative is necessary, while continuity up to the fifth derivative is preferred. In accordance with practice of principals of the invention, continuity to the sixth derivative was included at y=0, in order to yield a more gradual onset of astigmatism at the lower edge of the base region.

When such high orders of continuity are required, the simplest functional form to mathematically manipulate is a high order polynomial. It has been determined that the lowest order polynomial suitable for accommodating all of the continuity constraints described above is 11th order (comprises terms up to $y^{11}$) and may be written:

$$z(0,y)=\Sigma a_k y^k$$

Since the sag z and all odd derivatives of the curve of the base sphere must be 0 at y=0, it is clear that many of the coefficients $a_k$ reduce to 0 as well. Once the y offset of the add sphere's center of curvature is specified, the z offset of the add sphere can be easily computed in order to guarantee continuity of sag with the polynomial.

Because of the high degree of continuity (up to a sixth order derivative) between the IC sag and the base and add spheres, the curvature defined by the polynomial is substantially constant in the region about y=0 and y=−L. Appreciable curvature change occurs generally in the central third of the IC.

Figure 2:
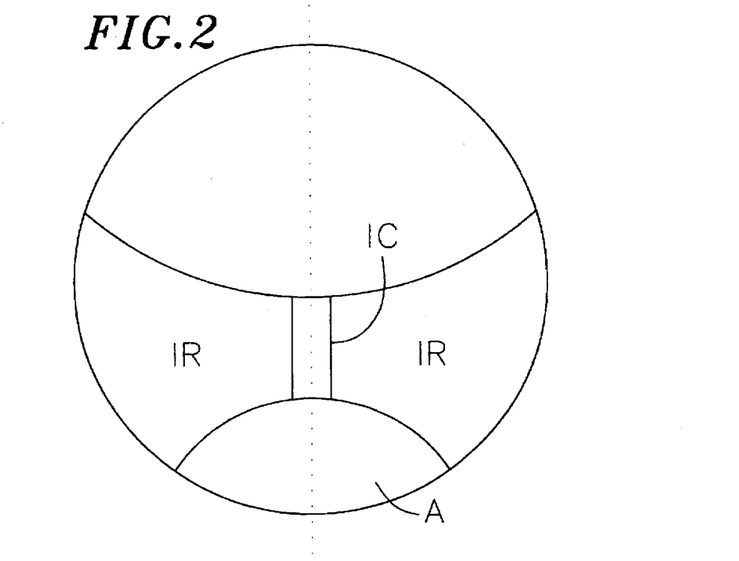
FIG. 2 is a vertical elevational view of a progressive addition lens depicting the distance and near vision regions, the intermediate corridor and the intermediate regions thereof.

With the central meridian profile of the lens now defined, the convex surface of a progressive addition lens in accord with the invention will now be described with reference to FIGS. 1 and 2. As described above in connection with FIG. 1, the base B and add A regions of the central meridian profile are circular arcs of intersection between the y,z plane and the base and add spherical regions. The surfaces of the base and add spheres define spherical sectors B and A, respectively in FIG. 2, arbitrary edges of which form the boundaries of the lens distance and near vision portions.

Once the surface contours of the distance portion and the near (reading) portion of the composite lens have been defined, the surface contour of the lens along the intermediate power region of the central meridian profile is developed. The surface contour in this region extends some small distance in the x direction (|x|<<L), to either side of the central meridional line, thereby defining a corridor (IC' of FIG. 2) between the distance portion and the near portion, termed the "intermediate corridor." This is accomplished by applying a geometric construct to the central meridian (MM' as depicted in FIG. 1), which may suitably described with reference to the concept of osculating spheres.

As described above in connection with the construction of the base B and add A sphere portions of the meridional line, for any point on the central meridian profile, there exists a circle in the y,z plane which osculates the polynomial sag function $z(0,y)$ at that point. At the osculation point, the functional expression of the circle equates with the sag function and its first and second derivatives. The center of curvature of the osculating circle lies in the y,z plane, and is located approximately in the region between the centers of curvature of the base sphere and the add sphere. As the osculation point is evaluated along the intermediate profile, the locus of successive centers of curvature of successive osculating circles traces out a continuous plane curve (denoted E in FIG. 1) between the base and add sphere centers of curvature, which is conventionally termed the "evolute".

To develop the surface contour of the intermediate corridor, each osculating circle is next defined as a great circle of a sphere, having the same radius and center of curvature of the circle. The family of osculating circles, having centers of curvature defined by the evolute, and radii defined by the evolute and sag function boundaries, thus becomes a family of osculating spheres which precesses along the central meridian profile. Each sphere is uniquely defined by evaluation of the polynomial sag function at any point along the intermediate profile and the corresponding center of curvature along the evolute. Points in the intermediate corridor, i.e. points along the central meridian profile and a small distance x to either side of the y,z plane, may be mathematically expressed in terms of a point on the surface of the osculating sphere corresponding to the y argument of the polynomial sag function $z(0,y)$.

In other words, the central meridian profile may be considered to be generated by the curve of intersection of an ordered sequence of osculating spheres and the y,z plane. The intermediate corridor may be considered as generated by an ordered sequence of arcuate sections of the said sequence of osculating spheres. As a consequence of this construction, the principal curvatures at each point along the central meridian profile and in the intermediate are equal, i.e. the surface is free of surface astigmatism at the meridional line and in the intermediate corridor.

Because a sphere has no surface astigmatism, mapping each point in the intermediate corridor onto the surface of a corresponding osculating sphere ensures that the progressive lens surface will exhibit no surface astigmatism for values of x lying along the corridor. For values of x outside the intermediate corridor IC (and outside the base B and add A spherical regions), in a region of the lens surface termed the "intermediate region" designated IR in FIG. 2, the sag function $z(x,y)$ is evaluated as though the progressive lens surface at that point lies on the surface of an osculating sphere. The particular osculating sphere used to compute the sag of a point $z(x,y)$ is determined by evaluating a spreading function, which for any given point (x,y), yields a corresponding meridional y value $Y_m$. Sag $z_m$ is next computed by evaluation of the polynomial at $Y_m$, yielding a calculated osculation point of $(0, y_m, z_m)$ which, in turn, defines a particular osculating sphere.

Figure 3:
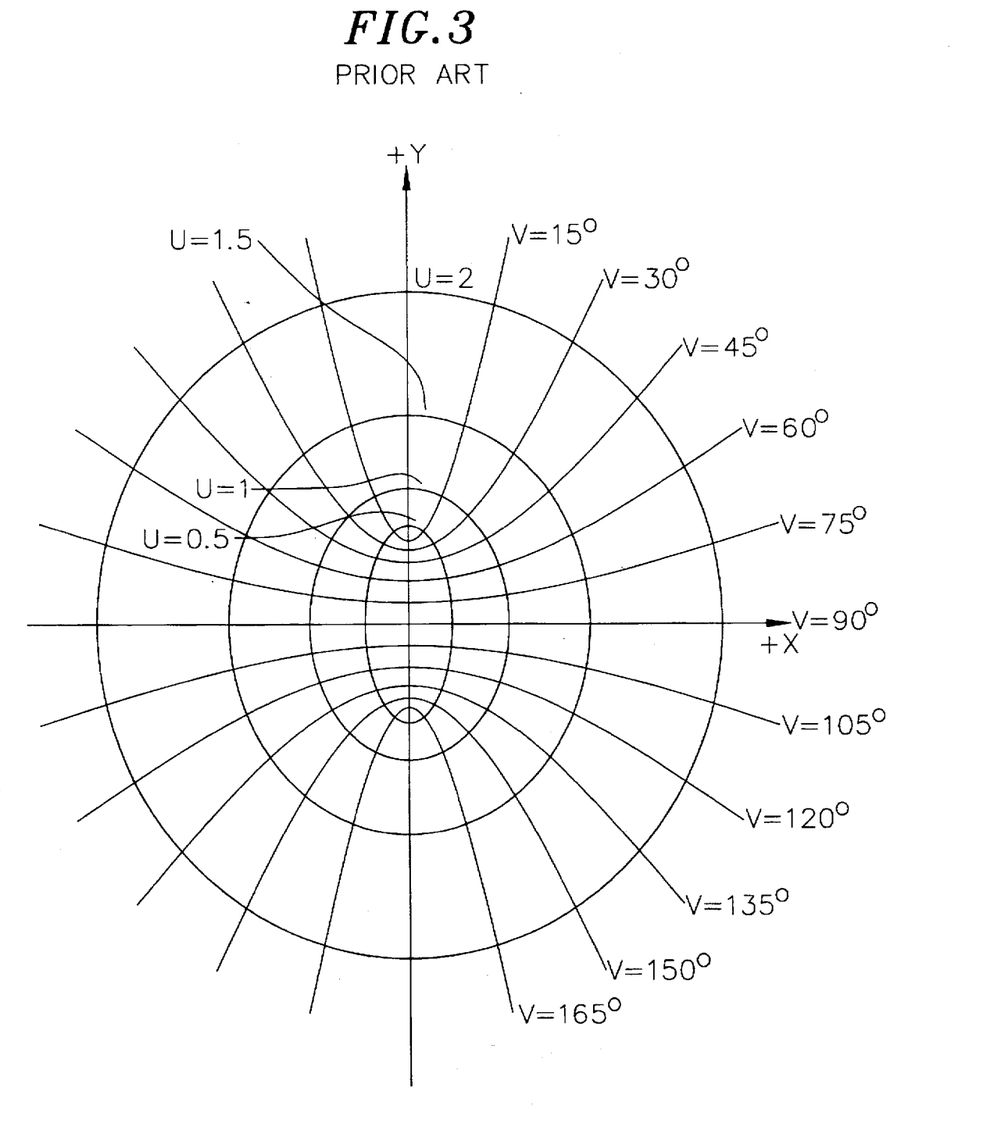
FIG. 3 is a graphical plot of the level curves of confocal hyperbolae forming the basis of a spreading function in accord with the prior art.

In the prior art, several functional forms have been used to define spreading functions, with varying degrees of success. Generally, any series of curves may be chosen to spread out the surface of progressive power away from the central meridian, with the most common forms involving the use of conic sections defined in the xy plane, and including the family of confocal hyperbolae as illustrated in FIG. 3. The confocal hyperbolae represent level curves of a curvilinear coordinate system derived from a conformal mapping of complex analysis given by:

$$w=\sinh z$$

where z represents a complex variable in x and y (z=x+iy) and w represents a complex variable in the angular parameters u and v (w=u+iv). In practice, a lens designer first chooses two angular parameters $v_1$ and $v_2$ which define the two hyperbolae forming the lower and upper boundaries, respectively, of the spherical base and add regions. The meridional y intercept $Y_m$ of the particular hyperbola which passes through any given set of points (x,y) is next computed.

A design parameter L, defined as the distance between the two hyperbolae, $v_1$ and $v_2$, represents generally the length of the intermediate corridor at x=0. A second design parameter is designated A and is defined as:

$$A=L/(\cos v_1 - \cos v_2)$$

where A is a length normalization parameter for the intermediate region. A further parameter $Y_L$ represents a vertical y coordinate offset term included to account for the fact that the origins of FIGS. 1 and 3 are not coincident, and is defined as:

$y_L = \hat{y} + A \cos v_1$

Once the spatial parameters are defined, a quadratic parameter q is defined as:

$$q = \sqrt{[\hat{x}^2 + (\hat{y}+1)^2][\hat{x}^2 + (\hat{y}-1)^2]}$$

or $$([\hat{x}^2 + (\hat{y}+1)^2][\hat{x}^2 + (\hat{y}-1)^2])^{1/2}$$

where $\hat{x}=x/A$ and $\hat{y}=y_L/A$, and represent a general normalization of the coordinate points (x,y) to the intermediate region defined between the base and add spheres. The quadratic parameter q allows simplification of certain expressions in the solution of the general hyperbolic conic equations where the meridional y intercept, $y_m$, of a given set of points (x,y) is now expressed as:

$$y_m = y_L \sqrt{2/(1+\hat{x}^2+\hat{y}^2+q)} - A \cos v_1$$

From the above, it is clear that if $0 > y_m > -L$, the osculation point lies inside the intermediate corridor and the particular osculating sphere associated with the point (x,y) of interest is derived from the polynomial and its first and second derivatives. If $y_m > 0$, the point of interest (x,y) is determined to lie on the base sphere, and its sag may be computed directly. Likewise, if $y_m < -L$, the point (x,y) is determined to lie on the add sphere.

One particular disadvantageous feature of the use of conic sections such as parabolae or hyperbolae as spreading functions is that as the functional expression is extended along x, its radius of curvature decreases. In other words, its greatest radius of curvature lies in regions of x substantially adjacent the y axis. This results in insufficient spreading, or wrapping, of the intermediate region away from the central meridian. Consequently, an objectional amount of surface astigmatism remains present in peripheral, but optically significant, regions of the lens. In the prior art such insufficient spreading at the extremities of the hyperbolic function has been compensated by including a perturbation term in the spreading function expression, to increase the curvature, and thus the spread, of the function at larger x values.

While successful to a certain degree in improving spread, and thereby reducing astigmatism, adding perturbation terms to the sag functional expression is somewhat arbitrary and makes the mathematical description of the lens surface needlessly computationally intensive.

Figure 4:
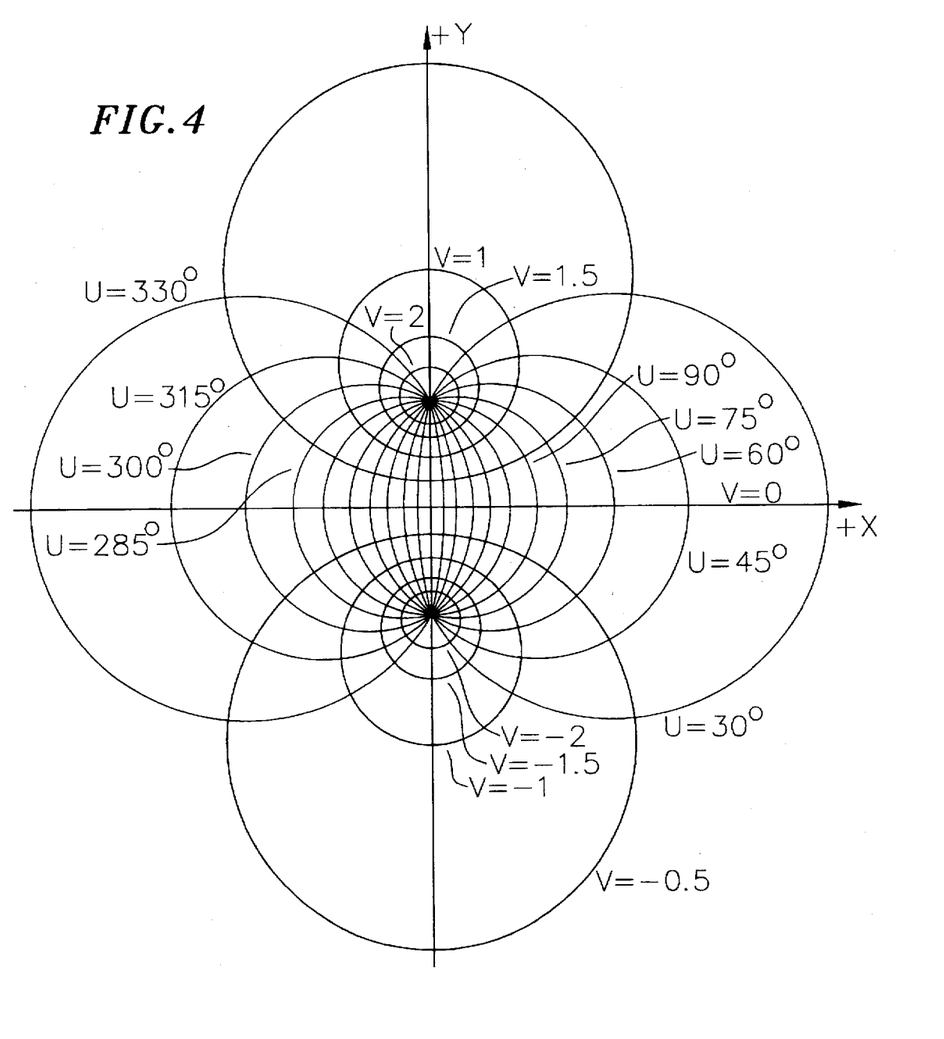
FIG. 4 is a plot of the level curves of a spreading function in accord with practice of the present invention.

Turning now to FIG. 4, in accordance with practice of principles of the present invention, the spreading function is preferably defined by a set of level curves of a curvilinear coordinate system derived from the conformal mapping given by:

$$w = \tan z$$

where w and z again represent complex variables (z=x+iy) and (w=u+iv) and in which the level curves are circular rather than parabolic or hyperbolic. The greater curvature of a circular spreading function allows the lens designer to spread out the astigmatism of the progressive surface to a greater degree than previously obtainable with hyperbolic spreading functions, thus lowering the magnitude of the astigmatism to the same degree.

With reference now to the curves depicted in FIG. 4, the lens designer chooses two curves defining the boundaries of the spherical base and add regions by defining two parameters $f_1$ and $f_2$, which must satisfy the condition $-1 < f_2 < f_1 < 1$ and which are expressed as:

$$f_1 = \tan h(v_1/2)$$

and $$f_2 = \tan h(v_2/2)$$

where $v_1$ and $v_2$ represent particular ones of the set of level curves depicted in FIG. 4. A length parameter A is defined as:

$$A = L/(f_1 - f_2)$$

where L is the length of the intermediate corridor or, alternatively, the distance between the two curves $v_1$ and $v_2$, such that A represents one half the distance between the foci of the function.

Once the base and add regions and the length parameter have been defined, the y coordinate is normalized by defining:

$$y_b = \hat{y} + Af_1$$

and the osculation point $(0, y_m)$ of any generalized coordinate point (x,y) is calculated by an expression of the form:

$y_m = At/(1+\sqrt{1-t^2}) - Af_1$ where t is an arbitrary parameter defined as:

$$t = 2Ay_b/(x^2 + y_b^2 + A^2)$$

In a manner similar to that of the confocal hyperbolic spreading function described above, the point of osculation lies in the intermediate corridor if the y intercept $Y_m$ is in the region $0 > y_m > -L$. Otherwise $y_m$ lies in the base sphere region if $y_m > 0$, and in the add sphere region if $y_m < -L$.

It will be appreciated that because of the greater curvature of the spreading function in accord with the present invention, the level curves of the function tend to "wrap" to a greater degree around the base and add sphere boundaries, particularly towards the edge of the lens, where previous hyperbolic functions required added perturbation terms to compensate for the function's decreasing curvature with increasing distance from the y axis. This increased "wrap" allows the function to distribute, or spread, surface astigmatism over a larger area of the lens, thus reducing its peak magnitude. Moreover, surface astigmatism is distributed into areas of the lens which are relatively less important optically, so that what astigmatism does remain is less noticeable to the spectacle wearer, with consequent physiological comfort improvements.

Because there is no need for added perturbation terms to increase functional curvature at the edges of the lens, the spreading function of the present invention is considerably less intensive computationally.

While the combination of the central meridional profile polynomial, the osculating sphere concept for construction of the intermediate corridor, and the circular spreading function contouring of the intermediate region, serves to reduce surface astigmatism to values previously unobtainable, certain optical aberrations remain due to the effects of visual astigmatism. In order to compensate for these effects, a progressive addition lens of the present invention corrects for visual astigmatism (referred to alternatively as ray traced astigmatism) across a substantial portion of the base and add spherical regions by superposing an asphere over the surface of the lens.

To optimize the visual astigmatism inherent in any lens design, the complex contour of the lens outer (convex) surface is first defined in accordance with the principles of the invention described above. The lens inner (concave)

surface is assumed to have a conventional spherical shape. Once the surfaces are defined, a computer model of the completed lens can be constructed in which the three dimensional surfaces of the lens and the successive derivatives at every point are given in accordance with the equations developed above. Computer aided design and modeling software of the sort described is well known in the field of optical design and requires no further description here. It is sufficient that one skilled in the art understands that the lens is represented by a model that accurately simulates its smooth, realistic and computable optical surfaces in accord with the invention, and that the model has sufficient resolution to compute the lens' optical characteristics.

For computation of the optical characteristics, raytracing software, of the kind well known in the field of optical design, is used to evaluate a system comprising a model of the lens in combination with a model of the human eye. Given a chief (or principal) ray incident at some point on the surface of the lens, the ray tracing software computes a corresponding emerging chief ray. The process is continued for a plurality of points on the lens surface and at a plurality of incident angles, and the lens-eye system is evaluated with respect to the main distortion/aberration properties of astigmatism and power error.

In accordance with practice of principles of the invention, the ray tracing process is performed and visual astigmatism and power error contour plots are developed.

Once visual astigmatism is computed for the lens-eye system, an asphere is defined which minimizes the computed aberrations, and functionally superposed on the lens surface by adding the sag from the aspheric to the sag determined by the spreading function/osculating sphere method described above. The aspheric sag is computed as follows:

A distance parameter h, representing the radial distance from the origin, is first defined by the relation:

$$h^2 = x^2 + (y-y_o)^2$$ where $Y_o$ represents an offset parameter which is arbitrarily adjustable, to allow the coordinate system origin to change. An angular parameter $\theta$ is then defined as:

$$\theta = \arctan((y-y_o)/x)$$

The aspheric sag term $z_A$ may then be expressed in terms of $\theta$ and h as:

$$z_A = c_{51}h^4 + c_{52}h^6 + c_{53}h^8 + (c_{54}h^4 + c_{55}h^6 + c_{56}h^8)\sin\theta + (c_{57}h^4 + c_{58}h^6 + c_{59}h^8)\cos 2\theta + (c_{60}h^4 + c_{61}h^6 + c_{62}h^8)\sin 3\theta$$

and the total sag function for the lens becomes:

$$sag = z(x,y) + z_A$$

The superposed asphere is constructed with terms that are both odd and even in y, and with a y offset $Y_o$, so that independent correction of visual astigmatism may be provided in both the base and add sphere regions. In order to maintain bilateral symmetry, all terms are even in x. The numerical coefficients $c_i$ are adjusted to fit the resultant aspheric curve to excursions developed in the visual astigmatic field by means of the computer simulations described above. Values for each of the coefficients are adjusted until visual astigmatism is minimized as determined by a least squares optimization technique.

Numerical Example

A particular example of a progressive addition lens constructed in accordance with practice of principles of the invention will now be described in connection with the plots of measured constant surface and visual astigmatism and constant power contours of FIGS. 5–10. The progressive addition lens of the illustrated embodiment is characterized by a base region with a refracting power of 0.0 diopters (6.0 diopters of surface power), and a reading or near focus addition region of 2.0 diopters refracting power. An intermediate corridor, connecting the base and add spheres, is characterized by a principal meridional curve, defined by at least an 11th order polynomial, and provides progressively varying optical power between the base and add regions. Following definition of the surface contours of the lens along the central corridor and in the intermediate regions, constant contours of surface astigmatism were computed to provide the computer generated performance plot of FIG. 5. Contour lines of constant mean surface astigmatism are plotted with an interval of 0.5 diopters, and performance characteristics of the lens result from computer evaluation of the lens model.

Figure 5:
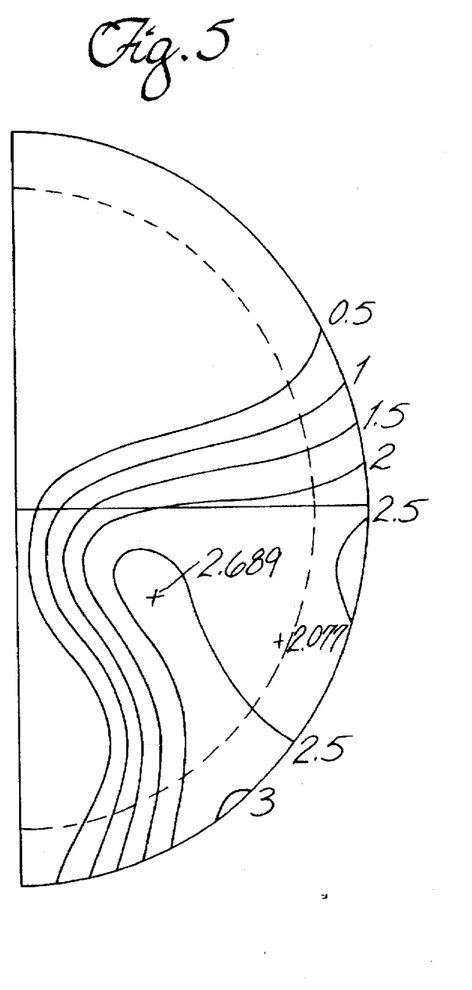
FIG. 5 is an isocontour plot of surface astigmatism of a progressive addition lens in accord with the present invention.

From FIG. 5, it can be seen that the peak surface astigmatism, evaluated within a 25 millimeter radius (50 mm diameter) of the fit point, has a value of only 2.689 diopters.

Figure 6:
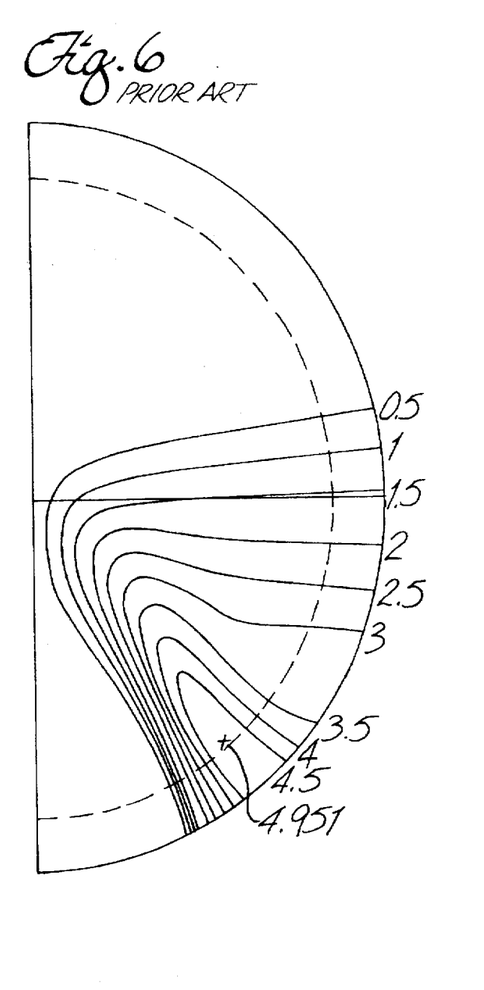
FIG. 6 is an isocontour plot of surface astigmatism of a progressive addition lens constructed in accord with the prior art.

As a comparative reference, a constant surface astigmatism contour plot of a conventional progressive addition lens is depicted in FIG. 6. As in FIG. 5, the lens is characterized by a 6.0 diopter base, a 2.0 diopter add with the isocontour lines being plotted in units of 0.5 diopters. The conventional progressive addition lens of FIG. 6 clearly exhibits a higher astigmatic density when compared to the embodiment of FIG. 5, as evidenced by the greater number of contour lines, as well as a significantly larger astigmatism gradient in the intermediate regions adjacent the add sphere.

Peak surface astigmatism values, within 50 millimeters diameter of the fit point, were determined to be 4.9 diopters.

Accordingly, the progressive addition lens in accord with the present invention offers a significant reduction in surface astigmatism over a conventional progressive addition lens, both in terms of absolute magnitude and in gradient in the intermediate region.

Figure 7:
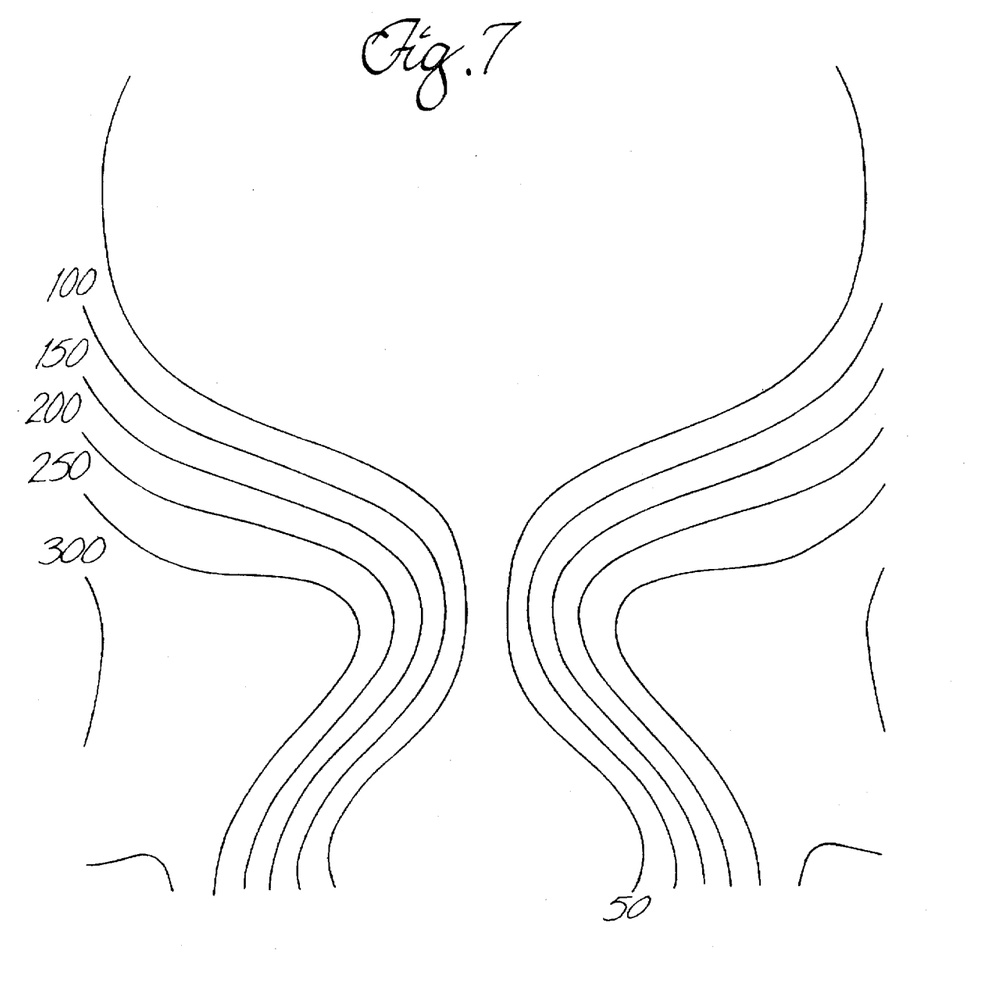
FIG. 7 is an isocontour plot of visual astigmatism of a progressive addition lens in accord with the present invention.
Figure 8:
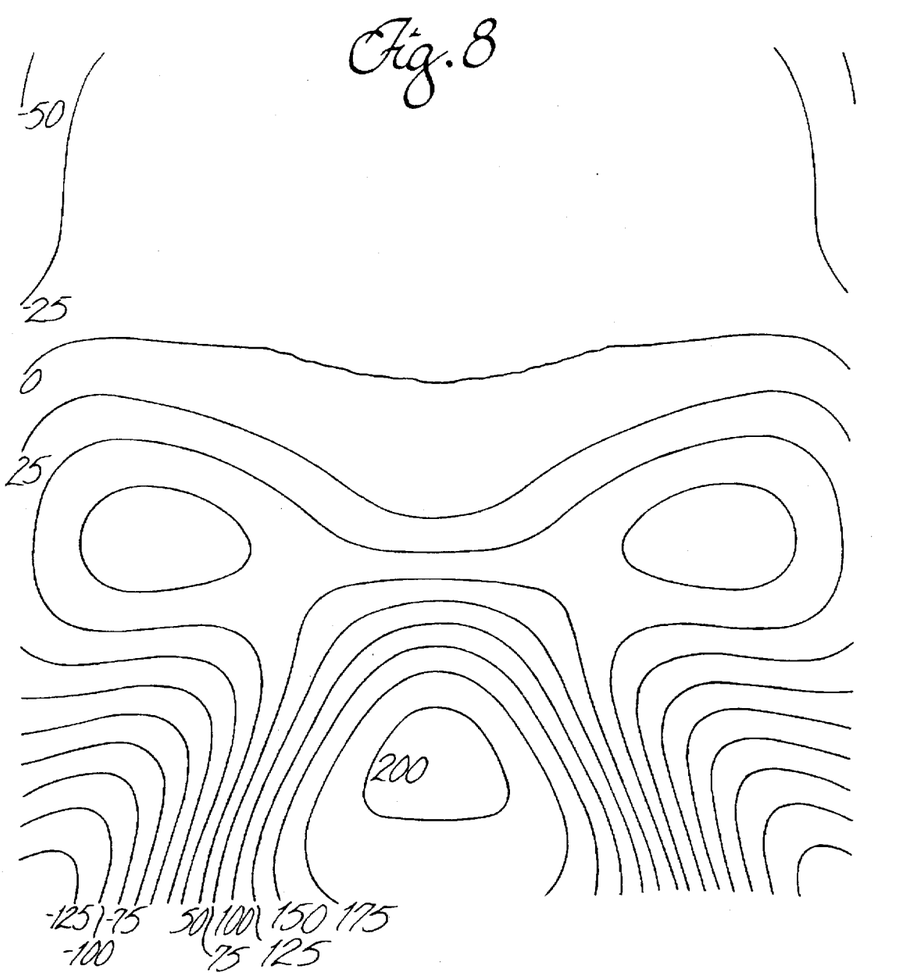
FIG. 8 is an isocontour visual power plot of a progressive addition lens in accord with the present invention.
Figure 9:
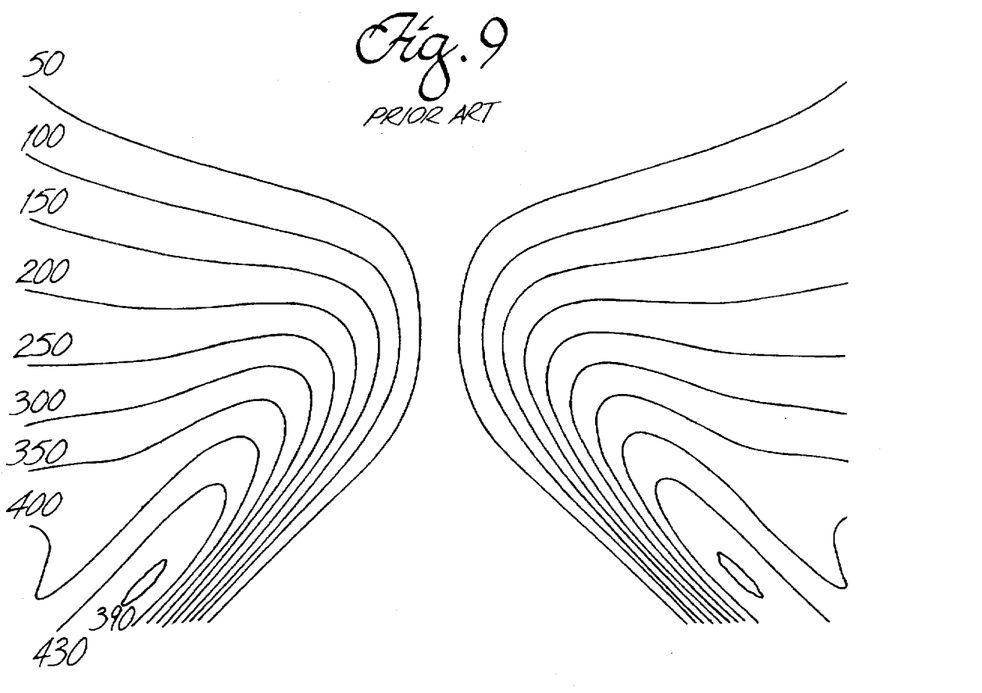
FIG. 9 is an isocontour plot of visual astigmatism of a progressive addition lens constructed in accord with the prior art.
Figure 10:
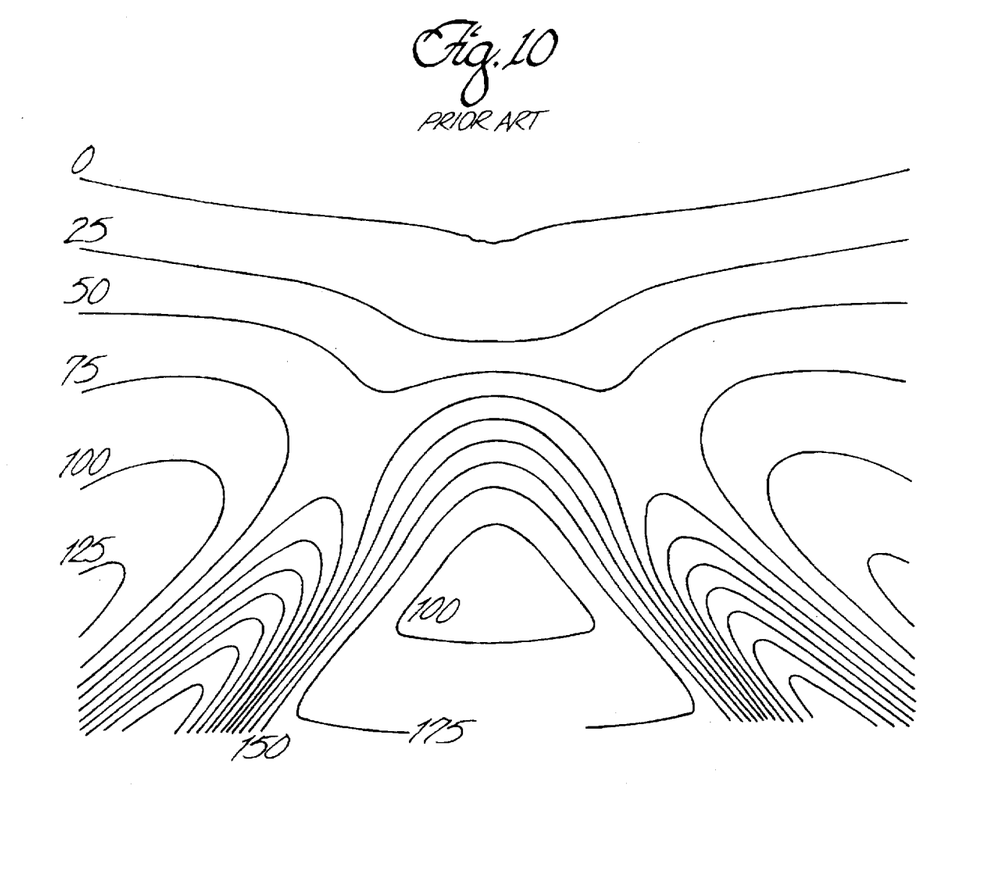
FIG. 10 is an isocontour visual power plot of a progressive addition lens constructed in accord with the prior art.

FIGS. 7 and 8 depict isocontour plots of the visual astigmatism and visual power of a progressive addition lens constructed in accord with the present invention. The progressive addition lens of the illustrated embodiment is characterized by visual performance improvement over a progressive addition lens of the prior art whose isocontour plots of visual astigmatism and visual power are depicted in FIGS. 9 and 10 for reference. When the visual performance of the progressive addition lens of the illustrative embodiment is evaluated, the length of the progressive intermediate corridor from the fit point to the desired add (2.0 diopter point) measures about 15.8 millimeters, and when evaluated from the fit point to the peak add (2.11 diopters) measures about 19.5 millimeters.

The progressive addition lens of FIG. 7 has been evaluated with respect to visual astigmatism, and it has been determined that the peak visual astigmatism, evaluated within a 25 millimeter radius (50 millimeter diameter) of the fit point, has a value of 2.91 diopters at a distance of about 19.5 millimeters from the fit point. Peak visual astigmatism, evaluated with a 32.5 millimeter radius (65 millimeter diameter) of the fit point, measures 3.01 diopters at a distance of 32.47 millimeters from the fit point.

As a comparative reference, a constant visual astigmatism contour plot of a conventional progressive addition lens is depicted in FIG. 9. As was the case with the lens of FIG. 7, the lens of FIG. 9 is characterized by a 6.0 diopter base, a 2.0 diopter add, with isocontour lines being plotted in units of 0.5 diopters. The conventional progressive addition lens of FIG. 9 clearly exhibits a higher visual astigmatic density when compared to the embodiment of FIG. 7, as evidenced by the greater number of contour lines and their small separation distance. This results in a significantly larger astigmatism gradient in the intermediate regions adjacent the add sphere.

Computer evaluations of the lens of FIG. 9 have determined that the length of the progressive corridor, from the fit point to the desired add, measures about 15.2 millimeters. The minimum corridor width between 0.5 diopters contours measures about 2.8 millimeters. Peak visual astigmatism values within 50 millimeters diameter of the fit point were determined to be 4.65 diopters at 24.8 millimeters distance, while peak visual astigmatism values within 65 millimeters of the fit point were determined to be 5.04 diopters at 31.42 millimeters distance.

Similar improvements in the visual field of a progressive addition lens constructed in accord with the present invention, as compared to a progressive addition lens of the prior art, may be seen by evaluating the isocontour plots of visual power for the respective lenses depicted in FIGS. 8 and 10. As can be seen by a comparison of the figures, the visual power of a lens constructed in accord with the present invention (FIG. 8) exhibits a generally uniform variation gradient in the intermediate region adjacent the add. In contrast, the visual power of a progressive addition lens according to the prior art (FIG. 10) exhibits an extreme gradient in visual power in the region immediately adjacent the add.

A progressive addition lens constructed in accord with practice of principles of the invention is able to achieve an about 39% reduction in astigmatism peak magnitude (3.01 vs 5.04 diopters) when compared to a lens constructed using a confocal hyperbolic spreading function and lacking a superposed asphere. Moreover, with regard to astigmatism in the optically relevant lens areas (within 50 millimeters diameter) the progressive addition lens of the invention exhibits an about 37% reduction in peak astigmatism magnitude.

Thus, according to the present invention, an ophthalmic lens having progressively variable optical power has been described with respect to the mathematical descriptions of its surface. The lens is characterized by a wide, clear distance vision portion, a near vision portion connected thereto by an intermediate corridor, and an improved intermediate region with reduced aberration density and lowered peak astigmatism. Surface astigmatism in the intermediate region is reduced by virtue of the improved curvature of the particular functional form of the invention's spreading function. Visual astigmatism is compensated by superposing an aspheric function over the mathematically defined sag of the lens.

It will be appreciated by those having skill in the art that the foregoing description and drawings are illustrative and that various modifications may be made thereto to suit particular optical requirements. Accordingly, the invention is not limited to the embodiments described but is intended to embrace all alternatives, variations and equivalents falling within the scope of the invention as defined by the following claims.

What is claimed is:

1. A progressive addition power ophthalmic lens comprising a lens body including a first optical portion having a refracting power corresponding to a distance viewing correction and a second optical portion having a refracting power corresponding to a near viewing correction, the lens further comprising:

an intermediate corridor connecting the first and second optical portions along a principal meridian of the lens surface, the corridor characterized by a continuously and smoothly varying refractive power in accordance with a power curve expressed as a polynomial which defines said principal meridian of the lens with respect to the y, z plane of a lens design coordinate system; and an intermediate optical region disposed to either side adjacent the intermediate corridor and extending to the periphery of the lens intermediate the first and second optical portions, the curvature of the surface of the intermediate region spreading away from the principal meridian in accordance with a spreading function defined as the level curves of the conformal mapping of $$w = \tan z$$

where z represents a complex variable in x and y ($z = x + iy$) and w represents a complex variable in angular parameters u and v ($w = u + iv$) whereby astigmatism is spread substantially uniformly into the entire area of the intermediate optical region.

2. The progressive addition ophthalmic lens of claim 1, wherein the surface sag of the intermediate corridor is defined by the surfaces of an ordered sequence of spheres which osculate the power curve, each of whose radius of curvature corresponds to the radius of curvature of the power curve when the power curve is evaluated at the osculation point.

3. The progressive addition ophthalmic lens of claim 1, wherein the polynomial defining the principal meridian is an at least 11th order polynomial.

4. The progressive addition ophthalmic lens of claim 1, wherein the level curves of the spreading function are circular.

5. The progressive addition ophthalmic lens of claim 4, wherein the first and second optical portions have spherical surface contours and the boundaries between the first and second optical portions and the intermediate optical region are defined by respective chosen ones of the level curves of the spreading function.

6. The progressive addition ophthalmic lens of claim 5, wherein the point of intersection between the level curves of the spreading function with the principal meridian identifies a corresponding osculating sphere associated with the principal meridian at the intersection point, the surface sag of the osculating sphere defining the surface sag of the lens along the isocontour of the spreading function.

7. A progressive addition power ophthalmic lens comprising a lens body including first and second optical portions having refracting powers corresponding to distance and near vision respectively, the surface contours of the first and second optical portions each characterized by spherical curvatures, the lens further comprising:

an intermediate corridor connecting the first and second optical portions along a principal meridian of the lens surface, the corridor characterized by a continuously and smoothly varying refractive power in accordance with a power curve expressed as a polynomial which defines said principal meridian of the lens with respect to the y,z plane of a lens design coordinate system; and an intermediate optical region disposed to either side adjacent the intermediate corridor and extending to the periphery of the lens between the first and second optical portions, the curvature of the surface of the intermediate region spreading away from the principal meridian in accordance with a spreading function defining level curves of uniform and continuous radii of curvature, the spreading function and polynomial in combination defining the surface contours of the lens in terms of a sag of the surface away from the x,y plane of the coordinate system, wherein visual astigmatism is corrected over a substantial fraction of the first and second optical portions by superposition of a function in the form of an asphere to the sag as defined by the polynomial and the spreading function.

8. The progressive addition ophthalmic lens of claim 7 wherein the spreading function is defined as the level curves of the conformal mapping of $$w = \tan z$$

where z represents a complex viable in x and y ($z=x+iy$) and w represents a complex variable in angular parameters u and v ($w=u+iv$) whereby astigmatism is spread substantially uniformly into the entire area of the intermediate optical region.

9. The progressive addition ophthalmic lens of claim 8 wherein the superposed asphere is a function of the form $$z_A = c_{51}h^4 + c_{52}h^6 + c_{53}h^8 + (c_{54}h^4 + c_{55}h^6 + c_{56}h^8)\sin\theta + (c_{57}h^4 + c_{58}h^6 + c_{59}h^8)\cos 2\theta + (c_{60}h^4 + c_{61}h^6 + c_{62}h^8)\sin 3\theta$$

where c represent adjustable numerical coefficients, the sag $z_A = f(h^2) = f(x^2 + (y-y'_o)^2)$, where $y_o$ represents a coordinate compensation offset parameter and $\theta = \arctan([y-y_o]/x)$.

10. The progressive addition ophthalmic lens of claim 9, wherein the surface contour of the intermediate corridor is defined by the surfaces of an ordered sequence of spheres which osculate the power curve, each of whose radius of curvature corresponds to the radius of curvature of the power curve when the power curve is evaluated at the osculation point.

11. The progressive addition ophthalmic lens of claim 10, wherein the polynomial defining the principal meridian is a polynomial of at least the 11th degree.

12. The progressive addition ophthalmic lens of claim 7, wherein the level curves of the spreading function are circular.

13. The progressive addition ophthalmic lens of claim 8, wherein the first and second optical portions have spherical surface contours and the boundaries between the first and second optical portions and the intermediate optical region are defined by respective chosen level curves of the spreading function.

14. The progressive addition ophthalmic lens of claim 10, wherein the point of intersection between the level curves of the spreading function with the principal meridian identifies a corresponding osculating sphere associated with the principal meridian at the intersection point, the surface curvature of the osculating sphere defining the surface curvature of the lens along the isocontour of the spreading function.

* * * * *